United States Patent [19]

Lamon et al.

[11] Patent Number: 5,453,453
[45] Date of Patent: Sep. 26, 1995

[54] FIRE-RESISTANT ESSENTIALLY HALOGEN-FREE EPOXY COMPOSITION

[75] Inventors: Alain H. Lamon, Osny; Sylvie C. Le Cozannet, Maisons-Laffite, both of France

[73] Assignee: Minnesota Mining and Manufacturing Company, St. Paul, Minn.

[21] Appl. No.: 223,775

[22] Filed: Apr. 6, 1994

[30] Foreign Application Priority Data

Apr. 9, 1993 [FR] France ................................ 93 04250

[51] Int. Cl.$^6$ ................................................ C08J 9/236
[52] U.S. Cl. .................... 521/54; 521/76; 521/85; 521/92; 521/95; 521/124; 521/125; 521/134; 521/135; 521/149; 521/150; 523/179
[58] Field of Search ................... 521/54, 85, 92, 521/95, 124, 125, 134, 135, 150, 907; 523/179

[56] References Cited

U.S. PATENT DOCUMENTS 3,018,262 1/1962 Schroeder ........................ 260/29.2
3,445,436 5/1969 Lake et al. ........................ 260/75
4,145,369 3/1979 Hira et al. ........................ 260/831
4,879,067 11/1989 Sakon et al. ..................... 252/609
5,019,605 5/1991 Jannic ............................. 523/219

FOREIGN PATENT DOCUMENTS

0290095A1 11/1988 European Pat. Off. .
0500009A1  8/1992 European Pat. Off. .
57-012037   1/1982 Japan .
2187745A    9/1987 United Kingdom .

*Primary Examiner*—Morton Foelak
*Attorney, Agent, or Firm*—Gary L. Griswold; Walter N. Kim; Steven E. Skolnick

[57] ABSTRACT

This invention is directed to a fire-resistant, essentially halogen-free epoxy composition that emits low amounts of smoke and toxic gas while burning. The one-part composition is particularly useful in aerospace applications for bonding, sealing and/or insulating metal, plastic and composite parts.

20 Claims, No Drawings

FIRE-RESISTANT ESSENTIALLY HALOGEN-FREE EPOXY COMPOSITION

BACKGROUND OF THE INVENTION

1. Field of the Invention

In general, this invention is directed to a fire-resistant, essentially halogen-free epoxy composition that emits low amounts of smoke and toxic gas while burning. The one-part composition is particularly useful in aerospace applications for bonding, sealing and/or insulating metal, plastic and composite parts.

2. Description of the Related Art

U.S. Pat. No. 5,019,605 discloses a low density, self-extinguishing epoxide composition comprising:

(a) from 10 to 75 percent by weight of an organic epoxide compound having an epoxide functionality of at least 1;

(b) from 1 to 25 percent by weight of an epoxide hardener;

(c) from 20 to 50 percent by weight of a smoke suppressant;

(d) from 10 to 25 percent by weight of a low density filler; and (e) from 1 to 10 percent by weight of an organic phosphorous-containing compound selected from the group consisting of alkyl phosphates, aryl phosphates, alkylphosphonates, arylphosphonates, and mixtures thereof.

The self-extinguishing composition, which contains from 3 to 10 percent by weight bromine, also provides smoke suppression and has excellent compressive strength.

More specifically, the epoxide composition, after hardening, possesses (i) a non-flaming smoke density of less than about 100 after 90 seconds and less than about 200 after 240 seconds, and (ii) a flaming smoke density of less than about 100 after 90 seconds and less than about 200 after 240 seconds.

Other characteristics preferably demonstrated by the hardened epoxide compositions include:

(i) a burn rate of less than 150 mm;

(ii) a flame time of less than 15 seconds; and (iii) a drip flame time of less than 3 seconds.

The epoxide compositions were apparently developed to satisfy Airbus Technical Specification (ATS) 1000.001 (Chapter 7), third issue, October, 1980 and FAR 25853 (a) and (b). However, the stringency of these specifications was subsequently increased to require smoke densities that do not exceed 150. Moreover, the bromine-containing component is potentially toxic.

U.S. Pat. No. 4,145,369 discloses a flame-retardant epoxy composition comprising 100 parts by weight of a polyepoxide containing more than one epoxy group, 0.8 to 1.2 equivalents of an acid anhydride curing agent per equivalent of the polyepoxide, 0.5 to 5 parts by weight of an imidazole curing agent per 100 parts by weight of the polyepoxide, an aluminum trihydrate powder, and either red phosphorus powder or red phosphorus powder coated with a thermosetting resin. The appropriate amounts of these latter materials are determined with reference to the graph of FIG. 1.

U.S. Pat. No. 4,879,067 discloses a flame retardant of red phosphorus and a non-flammable resinous composition containing the same. The red phosphorous is provided as fine spherical particles free of pulverized angular faces. The particles can be coated with a thermosetting resin and/or a hydroxide of aluminum or zinc. A mixture of (i) an alkaline earth metal hydroxide or an aluminium group hydroxide, and (ii) a phosphorus-containing material is not disclosed.

There is a continuing need for flame retardant compositions that do not include brominated materials or other potentially toxic ingredients and that can readily satisfy the more recent and stringent ATS 1000 specification.

SUMMARY OF THE INVENTION

This invention is directed to a fire-resistant, essentially halogen-free, one-part epoxy composition comprising:

(a) 100 parts by weight of an organic epoxide compound having an epoxide functionality of at least 1;

(b) from 2 to 180 parts by weight of an epoxide hardener;

(c) from 0.5 to 40 parts by weight of a film-forming material;

(d) from 0.5 to 30 parts by weight of a foaming agent; and (e) from 60 to 230 parts by weight of an essentially halogen-free fire-resistant system that includes:

(1) a smoke suppressant selected from the group consisting of alkaline earth metal hydroxides, aluminium group hydroxides, and mixtures thereof; and (2) a phosphorus-containing material.

When tested according to the ATS 1000 specification, the compositions of the invention display:

(i) a burn rate of less than 150 mm;

(ii) a flame time of less than 15 seconds;

(iii) a drip flame time of less than 3 seconds, when the hardened composition is held in a vertical position and ignited for 60 seconds; and (iv) a non-flaming smoke density and a flaming smoke density which are both less than 150 after 240 seconds. (Thus, the compositions are low smoke emitting.)

Consequently, the inventive compositions at least meet the ATS 1000 specification. Furthermore, the essentially halogen-free epoxide compositions of the invention are low toxic gas emitting. By "low toxic gas emitting" it is meant that compositions of the invention, when tested according to ATS 1000, have the following profile:

HF: less than 50 parts per million (ppm) after 1.5 minutes and 4 minutes;

HCl: less than 50 ppm after 1.5 minutes and less than 500 ppm after 4 minutes;

HCN: less than 100 ppm after 1.5 minutes and less than 150 ppm after 4 minutes;

$SO_2$: less than 50 ppm after 1.5 minutes and less than 100 ppm after 4 minutes;

CO: less than 3000 ppm after 1.5 minutes and less than 3500 ppm after 4 minutes; and $NO+NO_2$: less than 50 ppm after 1.5 minutes and less than 100 ppm after 4 minutes.

The compositions of the invention may be provided as a paste or a film that can be cured. The foaming agent permits the volume of the composition to increase during subsequent heat curing. The compositions of the invention, especially when provided as a film, are particularly useful as an edge sealer for void-containing structures such as honeycomb and/or as a means for joining the edges or borders of such structures.

DETAILED DESCRIPTION OF THE PREFERRED EMBODIMENTS

As used herein "fire-resistant" means that a hardened specimen of the epoxide composition will (i) either not burn at all when subjected to a heat or flame source or burn for no more than 15 seconds after the heat or flame source has been removed, and (ii) will have a smoke emission less than or equal to the ATS 1000 threshold as described above (i.e., the compositions are low smoke emitting). Thus, the hardened compositions of the invention pass the ATS 1000 specification.

As used herein, "essentially halogen-free" means that the compositions contain no more than a trace amount of halogen. Typical epoxide preparation techniques may result in a material that contains several halogen atoms or halogen-containing molecules. However, such materials are considered to be essentially halogen-free within the scope of the invention. Preferably, the compositions of the invention contain no more than about 50 parts of halogen per million parts of epoxy and, more preferably, no more than about 5 parts per million.

Any organic compound having an oxirane ring polymerizable by a ring opening reaction may be used as the organic epoxide in the compositions of the invention. Such materials, broadly called epoxides, include monomeric epoxy compounds and polymeric epoxy compounds and can be aliphatic, cycloaliphatic, aromatic or heterocyclic. Useful materials generally have at least two polymerizable epoxy groups per molecule and, more preferably, from two to four polymerizable epoxy groups per molecule.

The organic epoxide may vary from low molecular weight monomeric products to high molecular weight polymers and may also vary greatly in the nature of the backbone and any substituent groups. The molecular weight may vary from 58 to about 100,000 or more. The backbone may be of any type and is essentially halogen-free. Any substituents are also essentially halogen-free and may otherwise be any group not having a nucleophilic or an electrophilic moiety (such as an active hydrogen atom) that is reactive with an oxirane ring. Permissible substituents include ester groups, ether groups, sulfonate groups, siloxane groups, nitro groups, amide groups, nitrile groups, phosphate groups, etc. Mixtures of various organic epoxides may also be used in the compositions of the invention.

Preferred organic epoxides are selected from the group consisting of alkylene oxides, alkenyl oxides, glycidyl esters, glycidyl ethers, epoxy novolacs, copolymers of acrylic acid esters of glycidol and copolymerizable vinyl compounds, polyurethane polyepoxides, and mixtures thereof. More preferably, the organic epoxide is selected from the group consisting diglycidyl ethers of bisphenol A and epoxy novolacs.

Other useful organic epoxides include those disclosed in U.S. Pat. No. 5,019,605, U.S. Pat. No. 4,145,369, U.S. Pat. No. 3,445,436, U.S. Pat. No. 3,018,262, and *Handbook of Epoxy Resins* by Lee and Neville, McGraw Hill Book Co., New York (1967), the disclosures of which with respect to organic epoxides are incorporated herein by reference.

Epoxide hardeners useful in the invention are materials that react with the oxirane ring of the organic epoxide to cause substantial crosslinking of the epoxide. These materials contain at least one nucleophilic or electrophilic moiety (such as an active hydrogen atom) that cause the crosslinking reaction to occur. Epoxide hardeners are distinct from epoxide chain extension agents, which primarily become lodged between chains of the organic epoxide and cause little, if any, crosslinking. Epoxy hardeners as used herein are also known in the art as curing agents, catalysts, epoxy curatives, and curatives.

Epoxide hardeners useful in the invention include those which are conventionally used for curing epoxy resin compositions and forming crosslinked polymer networks. Such agents include aliphatic and aromatic primary amines, for example, di-(4-aminophenyl)sulfone, di-(4-aminophenyl)-ethers, and 2,2-bis(4-aminophenyl)propane. Such compounds also include aliphatic and aromatic tertiary amines such as dimethylaminopropylamine and pyridine, which may act as catalysts to generate substantial crosslinking. Further, boron complexes, in particular boron complexes with monoethanolamine, imidazoles such as 2-ethylmethylimidazole, guanidines such as tetramethyl guanidine, substituted ureas such as toluene diisocyanate urea, dicyanodiamide, and acid anhydrides such as the 4-methyltetrahydroxyphthalic acid anhydride, 3-methyltetrahydroxyphthalic acid anhydride and methylnorbornenephthalic acid anhydride, may be employed. Still other useful hardeners include polyamines, mercaptans and phenols.

Preferably, the epoxide hardener is selected from the group consisting of amines, acid anhydrides, guanidines, dicyandiamide and mixtures thereof. More preferably the epoxide hardener is a mixture of dicyandiamide and 2,4-di-(N',N'-dimethylureido)toluene of the respective formula:

and

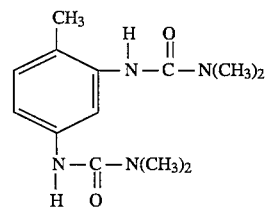

The amount of epoxide hardener that is required will vary depending on the particular hardener and epoxide. However, the hardener should be provided in an amount sufficient to cause substantially complete hardening of the composition within a desired length of time. About 2 to 180 parts by weight, based on 100 parts by weight of the organic epoxide, of an epoxide hardener is preferred. Even more preferred is the use of about 6 to 20 parts by weight of the epoxide hardener.

The compositions of the invention further comprise a film-forming material. Preferred film-forming materials are selected from the group consisting of butadiene/nitrile rubbers, carboxylated butadiene/nitrile rubbers (hereinafter referred to at times as "CBN" rubbers), amine-terminated butadiene/nitrile rubbers, polyether diamines, polyhydroxyethers, graft polymers having a rubbery polyacrylate core with a polyacrylate or polymethacrylate shell, polyvinyl acetals and mixtures thereof. More preferably, the film-forming material is a mixture of: (i) a polyhydroxyether compound such as a phenoxy resin, and (ii) a rubber component such as a CBN rubber.

The amount of the film-forming material present in the compositions of the invention will vary from about 0.5 to 40 parts by weight and, more preferably, from about 20 to 30 parts by weight, based on 100 parts by weight of the organic epoxide. The film-forming material used in examples 1 to 3 below comprises 6 parts by weight of a phenoxyresin and 20 parts by weight of a CBN.

Compositions according to the invention also include about 0.5 to 30 parts by weight, based on 100 parts by weight of the organic epoxide, of a foaming agent. Preferably the foaming agent is selected from the group consisting of: (i) materials that liberate a gas or a vapor upon heating, (ii) liquefied gases encapsulated in a polymeric thermoplastic shell, and (iii) mixtures thereof. More preferably, the composition comprises about 2 to 8 parts by weight of a foaming agent selected from the group consisting of: (i) azobisisobutryonitriles, azodicarbonamides, carbazides, hydrazides, non-azo chemical blowing agents based on sodium borohydride or sodium bicarbonate/citric acid, dinitrosopentamethylenetetraamine, (ii) liquified gases encapsulated in a polymeric thermoplastic shell, and (iii) mixtures thereof.

Most preferably, the foaming agent is 4 to 6 parts by weight of liquid isobutane encapsulated in microspheres consisting of a thermoplastic shell such as EXPANCEL available from Nobel Industries.

The compositions of the invention further comprise about 60 to 230 parts by weight (and, more preferably, about 100 to 200 parts by weight) based on 100 parts by weight of the organic epoxide, of an essentially halogen-free fire-resistant system comprising at least the following two components:
(1) a smoke suppressant selected from the group consisting of alkaline earth metal hydroxides, aluminium group hydroxides and mixtures thereof; and
(2) a phosphorus-containing material.

The smoke suppressant maybe an aluminium group hydroxide, magnesium hydroxide, or mixtures thereof. As an example, the smoke suppressant may be a mixture of up to 100% by weight aluminium hydroxide and up to 10% by weight magnesium hydroxide based on the total weight of the smoke suppressant. Preferably, the compositions of the invention include from 100 to 190 parts by weight of the smoke suppressant based on 100 parts by weight of the organic epoxide.

The phosphorous-containing material may be an encapsulated red phosphorus powder. Preferably the composition includes from 0.5 to 10 parts by Weight of the phosphorous-containing material based on 100 parts by weight of the organic epoxide.

However, the compositions of the invention may include other phosphorus-containing compounds such as those selected form the group consisting of alkyl phosphates, aryl phosphates, alkylphosphonates, aryl phosphonates and mixtures thereof. Such other phosphorus-containing compounds may provide up to 40 parts by weight based on 100 parts by weight of the organic epoxide.

The fire-resistant system may also include an optional boron-containing material, such as those selected from the group consisting of barium metaborates, calcium metaborates, zinc metaborates and mixtures thereof. These materials may provide up to 40 parts by weight based on 100 parts by weight of the organic epoxide.

Other optional ingredients that may be preferably incorporated into the compositions of the invention include wetting agents (preferably up to about 15 parts per 100 parts by weight of the organic epoxide) and low density fillers which are materials capable of reducing the density of the composition (preferably up to about parts per 100 parts by weight of the organic epoxide). Useful wetting agents may be selected from the group consisting of titanates, silanes, zirconates, zircoaluminates and mixtures thereof. The wetting agent improves the mixability and processability of the composition and can also enhance the composition's handling characteristics. Useful wetting agents are disclosed in U.S. Pat. No. 5,019,605. Low density fillers that may be used include hollow microspheres such as hollow glass microspheres.

Preferably, the compositions of the invention are first compounded into the form of an uncured paste that is subsequently converted, when needed, into a film form by melt extrusion, lamination or calendaring.

A particularly preferred essentially halogen-free, fire resistant epoxy composition according to the invention that is expandable during polymerization comprises:
(a) 100 parts by weight of an organic epoxide compound having an epoxide functionality of from 2 to 4;
(b) about 6 to 20 parts by weight of an epoxide hardener;
(c) about 20 to 30 parts by weight of a film-forming material;
(d) about 4 to 6 parts by weight of a foaming agent;
(e) about 100 to 200 parts by weight of a fire-resistant system comprising:
(1) about 100 to 190 parts by weight of an inorganic hydroxide smoke suppressant, and
(2) about 0.5 to 10 parts by weight of a phosphorus-containing material;
(f) optionally, up to 15 parts by weight of a wetting agent; and
(g) optionally, up to 100 parts by weight of an inorganic filler capable of reducing the density of the composition.

This composition, when provided as a paste or an uncured film, can be expanded by polymerization. The foaming agent provides an expansion rate of up to 400%, the expansion rate being the ratio of the volume of the cured product to the volume of the initial uncured product.

Further advantages and characteristics of the invention will be more clearly understood from the following nonlimiting examples in which all parts refer to parts by weight and are based on 100 parts by weight of the organic epoxide.

EXAMPLES 1 TO 3

The compositions of examples (Ex.) 1 to 3 are described in Table 1, below. The compositions of examples 1 to 3 may be prepared in either a three-step or a four-step method as follows:
(1) Prepare mixture A by dispersing the phenoxy resin in methyl ethyl ketone.
(2) Prepare mixture B by introducing into a mixing vessel the following ingredients: epoxy novolac resin, mixture A, CBN, and triphenylphosphine. This operation is carried out under an inert atmosphere with mixing at a temperature of from 100° to 110° C. for about one hour until a homogeneous blend is obtained.
(3) As an optional intermediate step, prepare mixture C by combining the epoxide hardeners (in powder form) with the methylphosphonate (in liquid form) to facilitate incorporation of the hardener in Step 4.
(4) Introduce into a mixing vessel the following components: mixture B, epoxy resin, hydrophobic fumed silica, silane compound, barium metaborate, aluminium hydroxide, red phosphorus, expansion agent, and mixture C (or its individual ingredients if optional Step 3 is not practiced). A homogenous composition is obtained by mixing for about three hours at a temperature less than or equal to 71° C.

TABLE 1

| Component | Ex. 1 | Ex. 2 | Ex. 3 |
| --- | --- | --- | --- |
| Polyhydroxyether (1) | 6.0 | 6.0 | 6.0 |
| CBN (2) | 20.0 | 20.0 | 20.0 |
| Epoxy novolac (3) | 67.5 | 67.5 | 67.5 |
| Triphenylphosphine | 0.1 | 0.1 | 0.1 |
| Epoxy resin (4) | 32.5 | 32.5 | 32.5 |
| Silane compound (5) | 3.0 | 3.0 | 3.0 |
| Aluminium hydroxide (6) | 148.0 | 165.0 | 165.0 |
| Red phosphorus (7) | 2.3 | 3.4 | 1.7 |
| Barium metaborate (8) | 19.0 | 0.0 | 0.0 |
| Silica (9) | 2.5 | 2.5 | 2.5 |
| Hollow glass microspheres (10) | 15.0 | 15.0 | –15.0 |
| Expansion agent (11) | 6.7 | 5.3 | 5.3 |
| Dicyandiamide (12) | 5.5 | 5.5 | 5.5 |
| Diurea compound (13) | 2.5 | 2.5 | 2.5 |
| Methylphosphonate (14) | 3.5 | 3.5 | 3.5 |

Notes to Table 1:
(1) Phenoxy resin available from Union Carbide Corp. under the trade designation PHENOXY PKHJ.
(2) Carboxy-terminated nitrile/butadiene rubber available from BF Goodrich Co. under the trade designation HYCAR CTBN 1300X8.
(3) Epoxy resin available from Dow Chemical Co. under the trade designation DEN 438.
(4) Epoxy resin available from Shell Chemical Co. under the trade designation EPIKOTE 828.
(5) Gamma-glycidoxypropyltrimethoxy silane available from Dow Corning Co. under the trade designation Z6040.
(6) SECUROC A, available from Incemin AG.
(7) Microencapsulated red phosphorus powder available from Albright & Wilson Ltd. under the trade designation AMGARD CRP.
(8) BUSAN 11 M2, available from Buckman Laboratories.
(9) Hydrophobic fumed silica available from Cabot Corp. under the trade designation CAB-O-SIL TS 720.
(10) Average diameter of about 20 to 100 micrometers, available from 3M Co.
(11) Encapsulated isobutane available from Nobel Industries under the trade designation EXPANCEL 051 DU.
(12) Micronized dicyandiamide available from Omicron Chemical under the trade designation DICYANDIAMIDE CG 1200.
(13) 2,4-di(N',N'-dimethylureido)toluene epoxide hardener available from Omicron Chemical under the trade designation OMICURE 24.
(14) Dimethyl methylphosphonate available from Stauffer Chemicals under the trade designation DMMP.

Examples 1 to 3 were converted into bulk cured materials measuring 75×75×32 mm and then tested according to ATS 1000.001 with the results shown in Table 2 below.

TABLE 2

| Test | Ex. 1 | Ex. 2 | Ex. 3 |
| --- | --- | --- | --- |
| Fire | (a) | (a) | (a) |
| Smoke density (b) | 66 | 96 | 59 |
| Toxic gas emission | (c) | (c) | (c) |

Notes to Table 2:
(a) Self-extinguishing
(b) Flame smoke density measure after 240 seconds
(c) Met ATS 1000 requirements.

Examples 1 to 3 show that compositions according to the invention meet or exceed the fire, smoke density and toxic gas emission requirements of ATS 1000.001. (The most recent embodiment of this requirement is now contained in Airbus Directive (ABD) 00031, Issue A, October, 1993.)

Various modifications are possible within the scope of the foregoing specification without departing from the spirit of the invention which is defined in the accompanying claims.

What is claimed is:
1. A fire-resistant, low smoke-emitting, and low toxic gases-emitting essentially halogen-free one-part epoxy composition comprising:
 (a) 100 parts by weight of an organic epoxide compound having an epoxide functionality of at least 1;
 (b) about 2 to 180 parts by weight of an epoxide hardener;
 (c) about 0.5 to 40 parts by weight of a film-forming material;
 (d) about 0.5 to 30 parts by weight of a foaming agent; and
 (e) about 60 to 230 parts by weight of an essentially halogen-free fire-resistant system that includes a mixture of:
  (1) a smoke suppressant selected from the group consisting of alkaline earth metal hydroxides, aluminium group hydroxides and mixtures thereof, and
  (2) a phosphorus-containing material; wherein the hardened composition when tested according to ATS 1000, exhibits:
 (i) a burn rate of less than 150 mm;
 (ii) a flame time of less than 15 seconds;
 (iii) a drip flame time of less than 3 seconds when the hardened composition is held in a vertical position and ignited for 60 seconds;
 (iv) a non-flaming smoke density and a flaming smoke density which are both less than 150 after 240 seconds; and
 (v) a toxic gas emission profile as follows:
  HF: less than 50 ppm after 1.5 minutes and 4 minutes;
  HCl: less than 50 ppm after 1.5 minutes and less than 500 ppm after 4 minutes;
  HCN: less than 100 ppm after 1.5 minutes and less than 150 ppm after 4 minutes;
  $SO_2$: less than 50 ppm after 1.5 minutes and less than 100 ppm after 4 minutes;
  CO: less than 3000 ppm after 1.5 minutes and less than 3500 ppm after 4 minutes; and
  $NO+NO_2$: less than 50 ppm after 1.5 minutes and less than 100 ppm after 4 minutes.

2. A fire-resistant composition according to claim 1, wherein said organic epoxide is selected from the group consisting of alkylene oxides, alkenyl oxides, glycidyl esters, glycidyl ethers, epoxy novolacs, copolymers of acrylic acid esters of glycidol and copolymerizable vinyl compounds, polyurethane polyepoxides and mixtures thereof.

3. A fire-resistant composition according to claim 2, wherein said organic epoxide has an epoxide functionality of from 2 to 4.

4. A fire-resistant composition according to claim 3, wherein said organic epoxide is selected from the group consisting of diglycidyl ethers of bisphenol A, epoxy novolacs and mixtures thereof.

5. A fire-resistant composition according to claim 1, wherein said epoxide hardener is selected from the group consisting of amines, acid anhydrides, boron complexes, guanidines, dicyandiamide and mixtures thereof.

6. A fire-resistant composition according to claim 5, wherein said epoxide hardener is a mixture of dicyandiamide and 2 4-di-(N',N'-dimethylureido)toluene 7. A fire-resistant composition according to claim 1, wherein said film-forming material is selected from the group consisting of butadiene/nitrile rubbers, carboxylated butadiene/nitrile rubbers, carboxy-terminated butadiene/nitrile rubbers, amine-terminated butadiene/nitrile rubbers, polyether diamines, polyhydroxyethers, graft polymers having a rubbery polyacrylate core with a polyacrylate or polymethacrylate shell, polyvinyl acetals and mixtures thereof.

8. A fire-resistant composition according to claim 7, wherein said film-forming material is a mixture of a phenoxy resin and of a carboxy-terminated butadiene/nitrile.

9. A fire-resistant composition according to claim 1, wherein said foaming agent is selected from the group consisting of (i) chemicals liberating a gas or a vapor on heating, (ii) liquefied gases encapsulated in a polymeric thermoplastic shell, and (iii) mixtures thereof.

10. A fire-resistant composition according to claim 1, comprising from 2 to 8 parts by weight of a foaming agent selected from the group comprising of (i) azobisisobutyronitriles, azodicarbonamides, carbazides, hydrazides, non-azo chemical blowing agents based on sodium borohydride or sodium bicarbonate/citric acid, dinitrosopentamethylenetetramines, (ii) liquified gases encapsulated in a polymeric thermoplastic shell, and (iii) mixtures thereof.

11. A fire-resistant composition according to claim 10, wherein the foaming agent is a liquid isobutane encapsulated in microspheres having a thermoplastic shell and provides about 4 to 6 parts by weight of the composition.

12. A fire-resistant composition according to claim 1, wherein said smoke suppressant is selected from the group consisting of (i) aluminium hydroxide and (ii) a mixture of 100% by weight of aluminium hydroxide and up to about 10% by weight of magnesium hydroxide.

13. A fire-resistant composition according to claim 12, comprising about 100 to 190 parts by weight of the smoke suppressant of claim 12.

14. A fire-resistant composition according to claim 1, wherein said phosphorus-containing material is encapsulated red phosphorus.

15. A fire-resistant composition according to claim 14, comprising about 0.5 to 10 parts by weight of said phosphorus-containing compound.

16. A fire-resistant composition according to claim 1, further comprising up to about 15 parts by weight of a wetting agent.

17. A fire-resistant composition according to claim 1, further comprising up to about 100 parts by weight of a filler capable of reducing the density of said composition.

18. A fire-resistant composition according to claim 1, further comprising up to about 40 parts by weight of a boron-containing material.

19. A fire-resistant composition according to claim 1, further comprising up to about 40 parts by weight of other phosphorus-containing materials.

20. A fire resistant composition according to claim 1, comprising:
(a) 100 parts by weight of an organic epoxide compound having an epoxide functionality of from 2 to 4;
(b) about 6 to 20 parts by weight of an epoxide hardener;
(c) about 20 to 30 parts by weight of a film-forming material;
(d) about 4 to 6 parts by weight of a foaming agent;
(e) about 100 to 200 parts by weight of a fire-resistant system that includes a mixture of:
  (1) about 100 to 190 parts by weight of an inorganic hydroxide smoke suppressant and,
  (2) about 0.5 to 10 parts by weight of a phosphorus-containing material;
(f) 0 to about 15 parts by weight of a wetting agent;
(g) 0 to about 100 parts by weight of an inorganic filler capable of reducing the density of said composition;
(h) 0 to about 40 parts by weight of a boron-containing material; and
(i) 0 to about 40 parts by weight of other phosphorus containing materials;
wherein said composition is either (i) an uncured one-part paste, or (ii) an uncured film that is expandable by polymerization.

* * * * *

UNITED STATES PATENT AND TRADEMARK OFFICE
CERTIFICATE OF CORRECTION

PATENT NO.: 5,453,453
DATED: September 26, 1995
INVENTOR(S): Alain H. Lamon and Sylvie C. Le Cozannet It is certified that error appears in the above-identified patent and that said Letters Patent is hereby corrected as shown below:

Column 4, line 30, (part of formula) "C(NH)" should read --C(=NH)--.

Column 5, line 65, --100-- should be inserted after "about".

Column 8, line 62, "2 4-di-(N',N"-dimethylureido)toluene" should read --2,4-di-(N',N'-dimethylureido)toluene--.

Signed and Sealed this

Fifteenth Day of October, 1996

Attest:

BRUCE LEHMAN

*Attesting Officer*  *Commissioner of Patents and Trademarks*